US012182394B2

(12) United States Patent
Friedman et al.

(10) Patent No.: US 12,182,394 B2
(45) Date of Patent: Dec. 31, 2024

(54) METHODS AND SYSTEMS FOR MANAGING MEMORY BUFFER USAGE WHILE PROCESSING COMPUTER SYSTEM OPERATIONS

(71) Applicant: Mellanox Technologies, Ltd., Yokneam (IL)

(72) Inventors: Yamin Friedman, Haifa (IL); Idan Burstein, Akko (IL); Gal Yefet, Haifa (IL)

(73) Assignee: Mellanox Technologies, Ltd., Yokneam (IL)

( * ) Notice: Subject to any disclaimer, the term of this patent is extended or adjusted under 35 U.S.C. 154(b) by 87 days.

(21) Appl. No.: 17/658,292

(22) Filed: Apr. 7, 2022

(65) Prior Publication Data
US 2023/0325075 A1 Oct. 12, 2023

(51) Int. Cl.
*G06F 3/06* (2006.01)
(52) U.S. Cl.
CPC .......... *G06F 3/0604* (2013.01); *G06F 3/0656* (2013.01); *G06F 3/0673* (2013.01)
(58) Field of Classification Search
CPC .... G06F 3/0604; G06F 3/0656; G06F 3/0673; G06F 2209/548; G06F 9/5022; G06F 9/546; G06F 9/5016
See application file for complete search history.

(56) References Cited

U.S. PATENT DOCUMENTS

| 2008/0147915 | A1* | 6/2008 | Kleymenov | G06F 9/5016 710/52 |
|---|---|---|---|---|
| 2018/0018133 | A1* | 1/2018 | Balakrishnan | G06F 3/0611 |
| 2019/0129656 | A1* | 5/2019 | Bains | G06F 3/0613 |
| 2020/0328192 | A1* | 10/2020 | Zaman | H04L 49/10 |
| 2021/0365209 | A1* | 11/2021 | L'Ecuyer | G06F 3/0613 |
| 2022/0382591 | A1* | 12/2022 | Rastogi | G06F 9/5027 |

* cited by examiner

*Primary Examiner* — Khoa D Doan
*Assistant Examiner* — Tong B. Vo
(74) *Attorney, Agent, or Firm* — Michael M. McCraw; Moore & Van Allen PLLC

(57) ABSTRACT

A method and system are provided for limiting unnecessary data traffic on the data communication connections connecting various system components, including the various levels of system memory. Some embodiments may include processing a buffer allotment request and/or a buffer release command in coordination with a system or network operation requiring temporary storage of data in a memory buffer. The buffer allotment request may be capable of indicating the amount of storage space required on the memory buffer to execute the system or network operation. The system may be capable of precluding the system or network operation from executing until there is sufficient space in the memory buffer to complete the operation without evicting operational data from the memory buffer. In some embodiments, the buffer release command may signal completion of the system or network operation and release of the utilized memory buffer space for other operations.

20 Claims, 7 Drawing Sheets

METHODS AND SYSTEMS FOR MANAGING MEMORY BUFFER USAGE WHILE PROCESSING COMPUTER SYSTEM OPERATIONS

TECHNOLOGICAL FIELD

Embodiments of the present disclosure relate generally to methods and systems for managing the processing of computer system operations.

BACKGROUND

Computer systems may often be employed to manage network traffic. Where memory bandwidth is limited, these computing device may be required to hold data that is in the process of being transferred from one network location to another. In some cases, a large number of network transactions may be received by such a computing device in a relatively short period of time. Through applied effort, ingenuity, and innovation, many of these identified problems have been solved by developing solutions that are included in embodiments of the present disclosure, many examples of which are described in detail herein.

BRIEF SUMMARY

Methods, systems, and computer program products for managing the memory usage of a computer system are provided. An example method may include receiving, by a transaction queue, a transaction and a buffer allotment request, wherein the transaction requires storage space in a memory buffer. The buffer allotment request may further include a first buffer usage indicator corresponding to the storage space required in the memory buffer to execute the transaction. An example method my further include precluding, in response to processing the buffer allotment request, the transaction from processing until determining the memory buffer has sufficient storage space for executing the transaction. Further, an example method may include executing the transaction in response to determining the memory buffer has sufficient storage space.

In some embodiments, the method may further include receiving, by the transaction queue, a buffer release command comprising a second buffer usage indicator. The buffer release command may be scheduled to be processed following processing of the transaction such that the storage space required in the memory buffer for executing the transaction is released.

In some embodiments, the method may further include a buffer arbiter, wherein the buffer arbiter precludes the transaction from executing until determining the memory buffer has sufficient storage space for executing the transaction.

In some embodiments, the method include receiving, by a central processor, the transaction requiring storage space in the memory buffer and sending, by the central processor, the buffer allotment request, the transaction, and the buffer release command to the transaction queue.

In some embodiments, the method may further include initializing a buffer arbiter count maintained by the buffer arbiter to a value representing the available storage in the memory buffer.

In some embodiments, the method may further include updating the buffer arbiter count, in response to processing the buffer allotment request, based on the first buffer usage indicator and updating the buffer arbiter count, in response to processing the buffer release command, based on the second buffer usage indicator.

In some embodiments, the method may further include processing the transaction by a command processor and confining the memory buffer to a cache memory associated with the command processor.

In some embodiments, the method may be executed wherein the buffer arbiter and the transaction queue are integrated into a network interface card.

In some embodiments, the method may further include implementing the buffer arbiter in an application-specific integrated circuit.

In some embodiments, the transaction queue may be configured to receive network transaction operations requiring storage of data in the memory buffer.

An example system for providing a buffer request which precludes an associated operation from executing until there is sufficient storage space in a memory buffer is further included. The system may include a memory buffer configured to store data and a transaction queue configured to receive a transaction and a buffer allotment request, wherein the transaction requires storage space in the memory buffer and the buffer allotment request includes a first buffer usage indicator corresponding to the storage space required in the memory buffer for executing the transaction. The system may further include a buffer arbiter configured to receive the buffer allotment request and to preclude the transaction from executing in response to the buffer allotment request until the buffer arbiter determines the memory buffer has sufficient storage space to execute the transaction.

In some embodiments, the transaction queue may be configured to receive a buffer release command, wherein the buffer release command comprises a second buffer usage indicator and wherein the buffer release command is scheduled to be processed following processing of the transaction such that the storage space required in the memory buffer for executing the transaction is released.

In some embodiments, the system may further include a central processor configured to receive the transaction requiring storage of data in the memory buffer and transmit the buffer allotment request, the transaction, and the buffer release command to the transaction queue.

In some embodiments, the buffer arbiter may further include a buffer arbiter count representing the available storage in the memory buffer.

In some embodiments, the buffer arbiter count may be updated in response to processing the buffer allotment request, based on the first buffer usage indicator; and the buffer arbiter count may be updated in response to processing the buffer release command, based on the second buffer usage indicator.

In some embodiments, the transaction may processed by a command processor and the memory buffer may be confined to a cache memory associated with the command processor.

In some embodiments, the buffer arbiter may be implemented as part of the command processor.

In some embodiments, the buffer arbiter and the transaction queue may be integrated into a network interface card.

In some embodiments, the buffer arbiter and the transaction queue may be implemented in an application-specific integrated circuit.

In some embodiments, the transaction queue may be configured to receive network transaction operations requiring storage of data in the memory buffer.

An example computer program product for receiving a buffer request and precluding the execution of an associated command until there is sufficient space in an associated memory buffer is further included. The computer program product may include at least one non-transitory computer-readable storage medium having computer-executable program code instructions. The program code instructions may be configured to receive, by a transaction queue, a transaction and a buffer allotment request, wherein the transaction requires storage space in a memory buffer, and wherein the buffer allotment request comprises a first buffer usage indicator corresponding to the storage space required in the memory buffer to execute the transaction. The computer program product may be figure configured to preclude, in response to processing the buffer allotment request, the transaction from processing until determining the memory buffer has sufficient storage space for executing the transaction. Further, the computer program code may be configured to execute the transaction in response to determining the memory buffer has sufficient storage space.

In some embodiments, the computer program product may further include receiving, by the transaction queue, a buffer release command comprising a second buffer usage indicator, wherein the buffer release command is scheduled to be processed following processing of the transaction such that the storage space required in the memory buffer for executing the transaction is released.

In some embodiments, the computer program product may be configured to receive network transaction operations requiring storage of data in the memory buffer.

BRIEF DESCRIPTION OF THE DRAWINGS

Having thus described certain example embodiments of the present disclosure in general terms, reference will now be made to the accompanying drawings. The components illustrated in the figures may or may not be present in certain embodiments described herein. Some embodiments may include fewer (or more) components than those shown in the figures.

Figure 1:
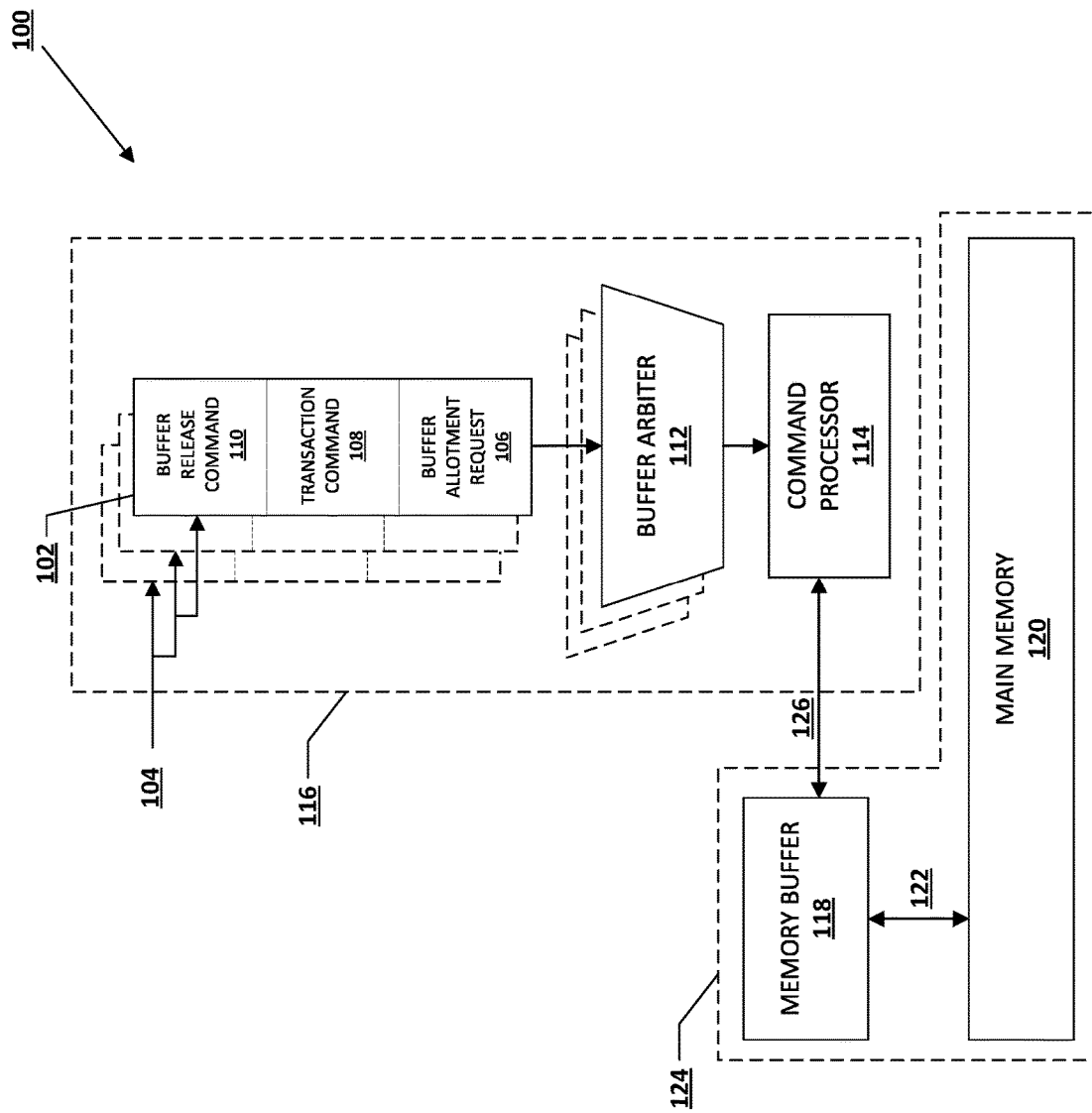
Figure 2:
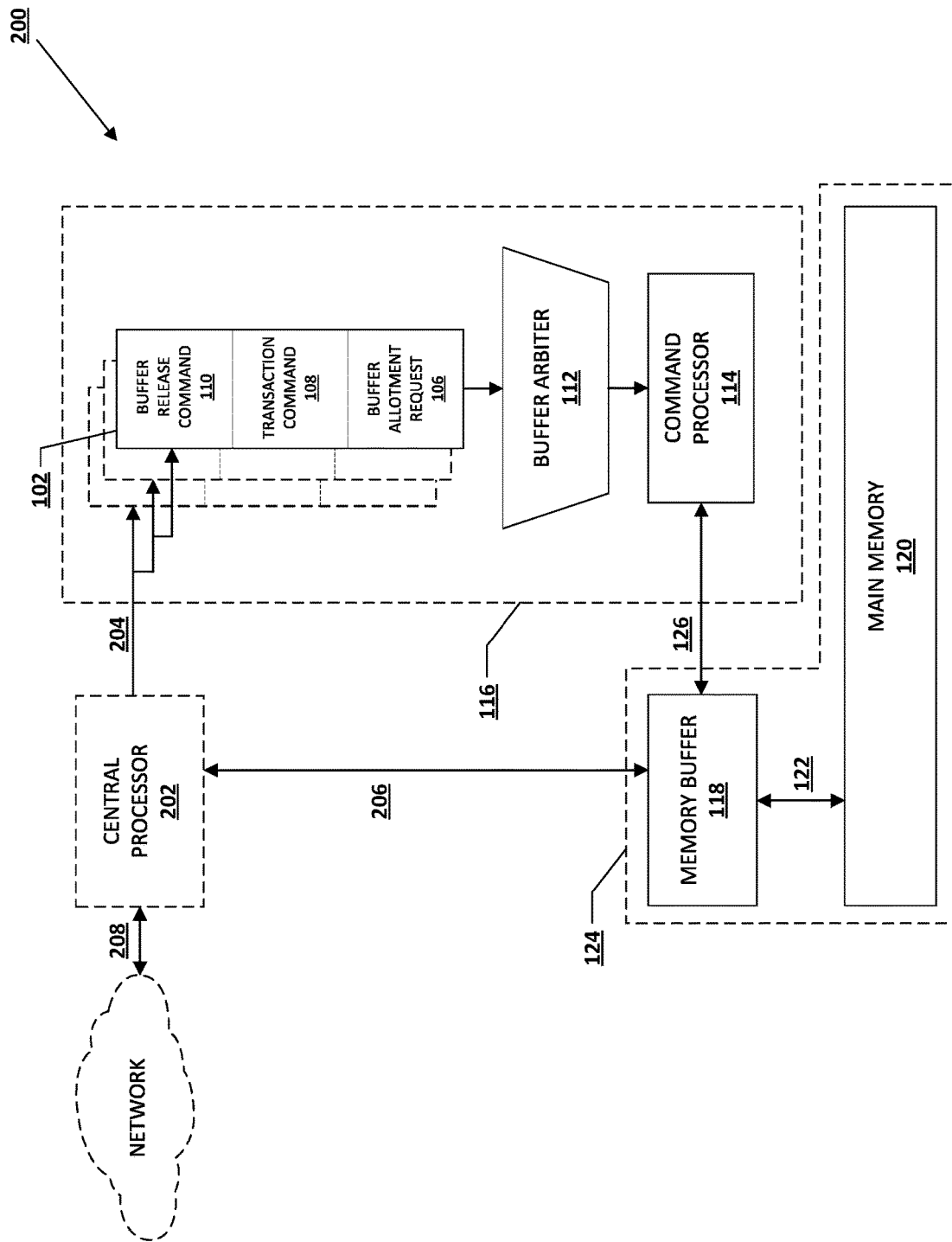
Figure 3:
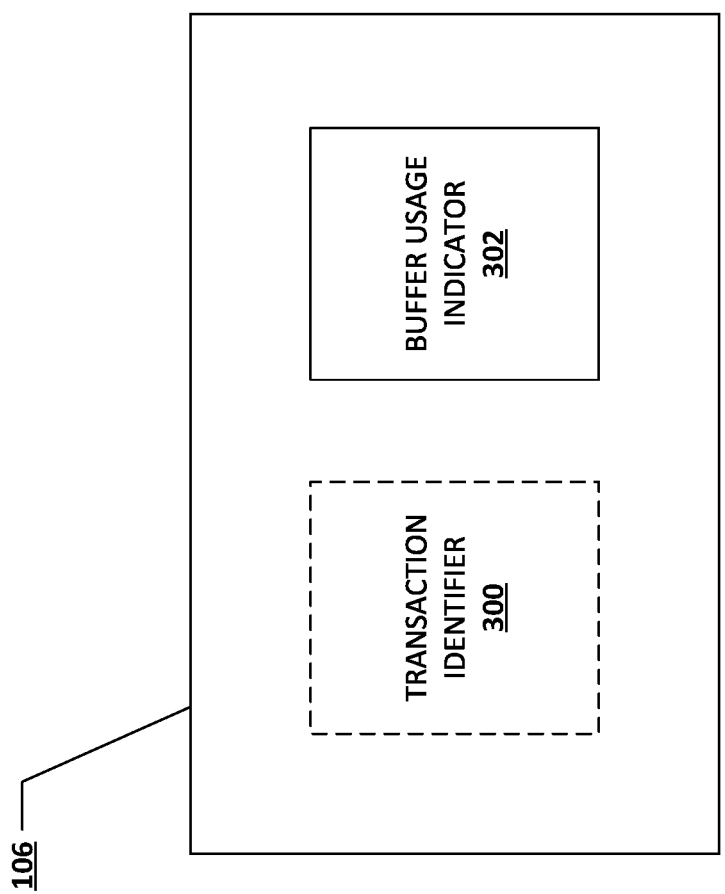
Figure 4:
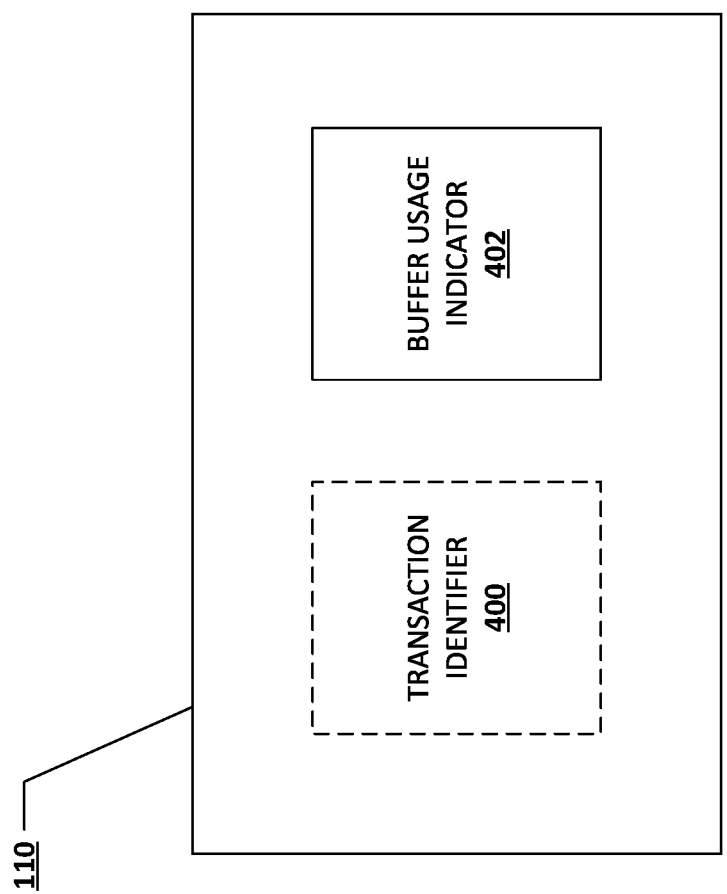
Figure 5:
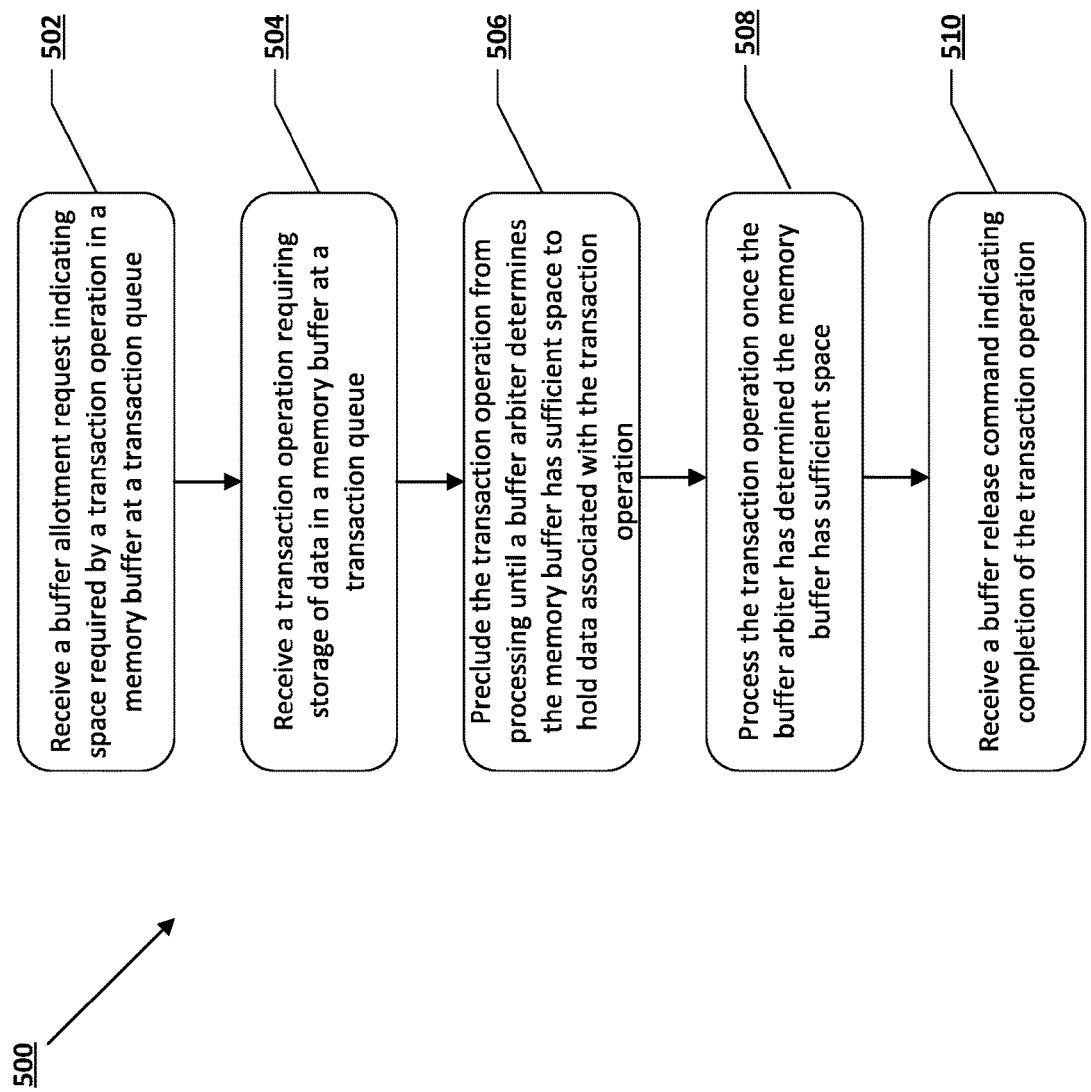
Figure 6:
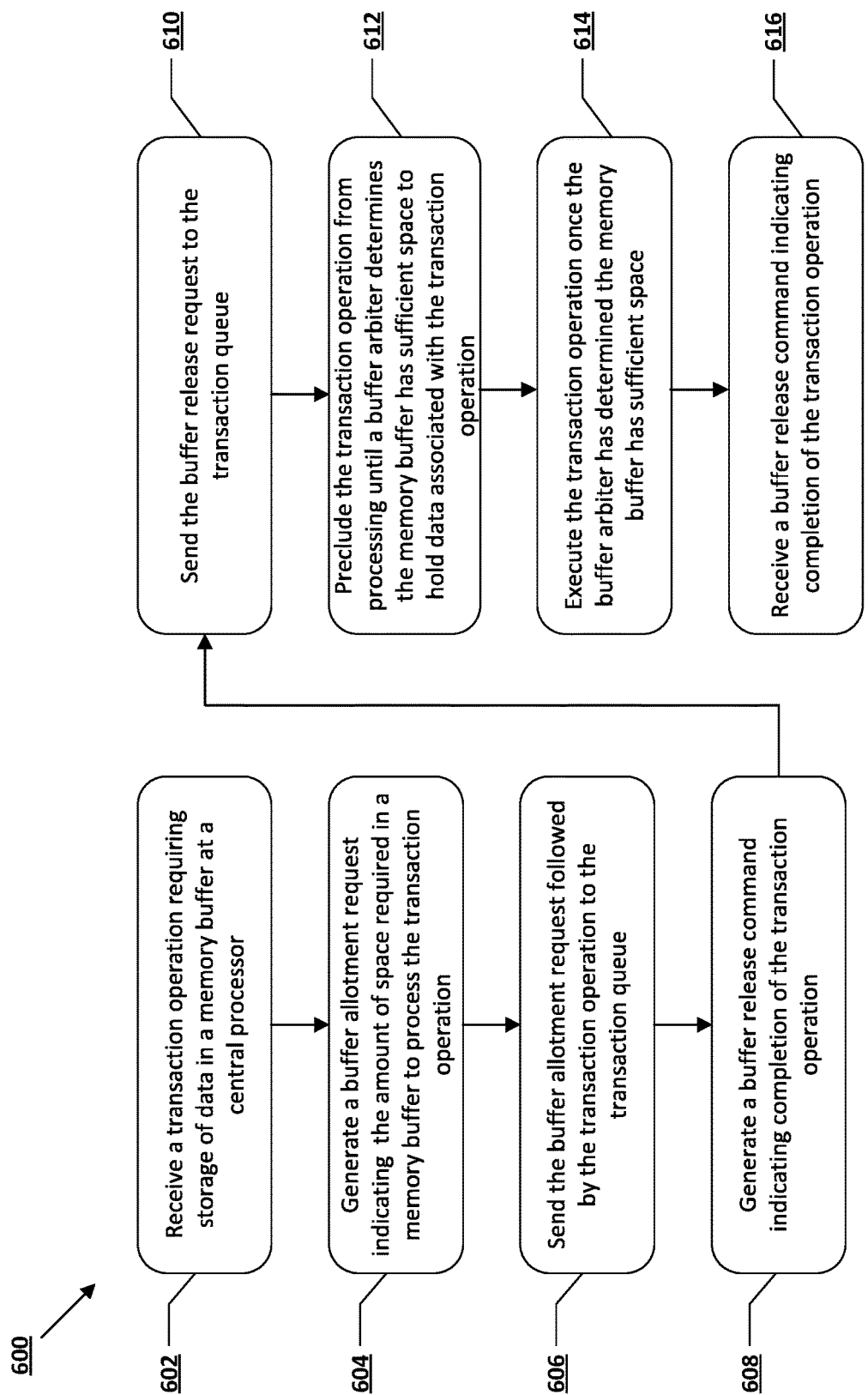
Figure 7:
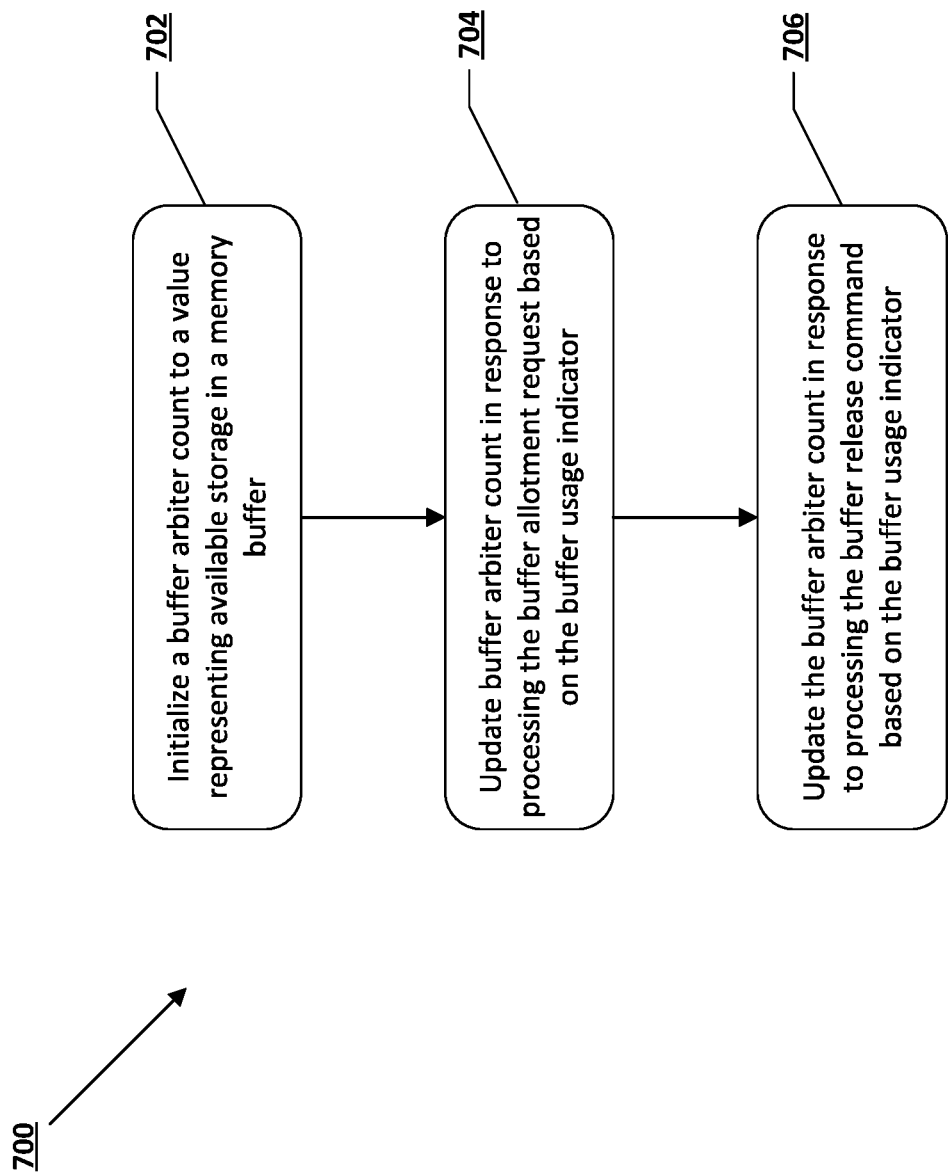

FIG. 1 illustrates an example system for receiving operations associated with network transactions, in accordance with one or more embodiments of the present invention;

FIG. 2 illustrates a system for receiving network transactions at a central processor communicatively connected to a network, in accordance with one or more embodiments of the present invention;

FIG. 3 illustrates a block diagram of an example buffer allotment request, in accordance with one or more embodiments of the present invention;

FIG. 4 illustrates a block diagram of an example buffer release command, in accordance with one or more embodiments of the present invention;

FIG. 5 illustrates a flowchart for performing a process of precluding a network transaction from processing in accordance with one or more embodiments of the present invention;

FIG. 6 illustrates a flowchart for performing a process of receiving a network transaction at a central processor, in accordance with one or more embodiments of the present invention; and FIG. 7 illustrates a flowchart for performing a process of initializing and updating a buffer arbiter count, in accordance with one or more embodiments of the present invention.

DETAILED DESCRIPTION

Overview

Various embodiments of the present disclosure will now be described more fully hereinafter with reference to the accompanying drawings in which some but not all embodiments are shown. Indeed, the present disclosure may be embodied in many different forms and should not be construed as limited to the embodiments set forth herein; rather these embodiments are provided so that this disclosure will satisfy applicable legal requirements. Like reference numerals refer to like elements throughout.

Systems and methods are provided according to the example embodiments of the present disclosure for managing the processing of network transactions to avoid costly cache evictions and reduce unnecessary traffic between the various levels of system memory while performing system and/or network operations. In general, when handling network transactions which require temporarily holding data while the network transaction is processing, a computer system will store the associated network transaction data in cache memory to provide faster access to the data. When a large number of transactions are received in a relatively short period of time, however, data temporarily stored in cache memory may be evicted to lower levels of cache memory or main memory. Requiring a processing transaction to access main memory to complete the network transaction significantly reduces the processing time of the transaction. In addition, reading and writing to and from the main memory increases the amount of traffic on the memory bus. In cases where the bandwidth on the memory bus is limited, unnecessary traffic may further limit the overall system performance. As such, it is desirable to manage network transactions in such a way to prevent temporarily held data necessary to ongoing network transactions, from being evicted into lower levels of memory.

There are a number of deficiencies and problems associated with present methods and systems for managing network transactions. For example, current solutions often use mechanisms to pace the flow of network transactions which requires prior knowledge of the latency of certain transactions. The pacing mechanisms will then schedule network transactions based on the predetermined estimate of a given command, in an effort to ensure that memory resources are available for the executing command. This solution is insufficient because the latency of operations may vary depending on the hardware products used throughout the network. Further, while pacing algorithms may adjust when a latency spike is encountered, recognition of latency spikes often occur too late, such as after data has already been evicted from the memory cache and network transactions are in process. Also problematic is that conventional solutions manage the execution of network transactions using software solutions. Solutions utilizing software must be notified of the current state of the hardware to make informed decisions and then execute instructions to make necessary changes. By utilizing software to manage the network transactions, additional latency is introduced into the processing system.

Accordingly, the embodiments described herein provide methods and systems in which a transaction processing system may receive requests and commands to request and release buffer space as required by a system transaction. The request and release of buffer space allows a transaction processing system to ensure there is sufficient space in the system's memory buffer to complete the incoming transaction. Ensuring sufficient buffer space before processing a system transaction improves the overall efficiency of the transaction processing system.

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein as receiving data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein as sending data to another computing device, it will be appreciated that the data may be sent directly to another computing device or may be sent indirectly via one or more intermediary computing devices, such as, for example, one or more servers, relays, routers, network access points, base stations, hosts, and/or the like.

Embodiments of the present disclosure are described below with reference to block diagrams and flowchart illustrations. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

The terms "illustrative," "exemplary," and "example" as may be used herein are not provided to convey any qualitative assessment, but instead merely to convey an illustration of an example. Thus, use of any such terms should not be taken to limit the spirit and scope of embodiments of the present invention. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment).

Transaction Processing System

FIG. 1 illustrates a transaction processing system 100 as an example system for: receiving input commands 104 associated with system and/or network transactions; precluding network transactions from processing until there are sufficient resources in a memory buffer 118 to execute the network transactions; processing the network transactions; and releasing resources once the network transactions have completed processing. It will be appreciated that the transaction processing system 100 is provided as an example of an embodiment(s) and should not be construed to narrow the scope or spirit of the disclosure in any way.

As illustrated in FIG. 1, the transaction processing system 100 may include a transaction processing module (TPM) 116 and a memory hierarchy system 124. The memory hierarchy system 124 may include at least one memory buffer 118 communicatively connected to a main memory 120 by a main memory bus 122. The transaction processing system 100 may be configured to receive input commands 104, including network transactions, from a processor manufactured to be distributed with the transaction processing system 100, a processor external to the transaction processing system 100, an external host, or any other module capable of sending and requesting network transactions. In some embodiments, the transaction processing system 100 may be dedicated exclusively to the receipt and processing of network transactions. In other embodiments, the transaction processing system 100 may receive and execute system and/or network transactions. The transaction processing system 100 may utilize the transaction processing module 116 to receive and manage network transactions and related commands. The transaction processing system 100 may further utilize the memory hierarchy system 124 for the storage of data associated with network transactions.

The transaction processing module 116 may be embodied in an entirely hardware embodiment, an entirely computer program product embodiment, an entirely firmware embodiment (e.g., application-specific integrated circuit (ASIC), field-programmable gate array (FPGA), etc.), and/or an embodiment that includes a combination of computer program products, hardware, and firmware. The transaction processing module 116 and memory hierarchy system 124 may be embodied on a single computing device or distributed across a plurality of computing devices collectively configured to function as a transaction processing system 100. In some embodiments, the functionality of the transaction processing module 116 may be implemented as part of a network interface card (NIC).

As further illustrated in FIG. 1, the transaction processing module 116 may include one or more transaction queues 102, a buffer arbiter 112, and a command processor 114.

A transaction processing module 116 may receive input commands 104 into one or more transaction queues 102 from a processor external to the transaction processing system 100 of FIG. 1. The transaction queue 102 may be configured to receive buffer allotment requests 106, transaction commands 108, and/or buffer release commands 110, as well as other commands related to processing system and/or network transactions. Transaction commands 108 may include, for example, system transactions/operations, network put/post commands, network read/write commands, network atomic commands, direct memory access (DMA) commands, remote direct memory access (RDMA) read/write commands, compression, encryption, and/or similar network transactions. The transaction queue 102 may hold input commands 104 in a defined order or sequence until the input commands 104 are executed. The order may be defined based on arrival time of the input commands 104, the defined priority of the input commands 104, a combination of arrival time and priority, or similar methods. As illustrated in FIG. 1, to improve performance of the transaction processing system 100, the transaction queue 102 may be configured to receive a buffer allotment request 106 prior to receiving a transaction command 108 associated with a system and/or network transaction requiring storage of data in the memory buffer 118. In addition, the transaction queue 102 may be configured to receive a buffer release command 110 following the transaction command 108 utilizing the storage of data in the memory buffer 118.

The buffer arbiter 112 may be configured to monitor the available space for transaction commands 108 in the memory buffer 118. In some embodiments, the buffer arbiter 112 may define a buffer arbiter 112 count which may be initialized (e.g., set to an initial value) to a value representing the total amount of space available in the memory buffer 118 available for network transactions. The buffer arbiter 112 count may be initialized by an external software host or may be initialized by the transaction processing system 100 at startup or upon reset. The initial buffer arbiter 112 count may represent the entire cache memory space, a portion of the cache memory space, or any portion of the memory hierarchy system 124 allocated for temporary storage of transaction command 108 data. The buffer arbiter 112 may be configured to recognize buffer allotment requests 106 and buffer release commands 110. The buffer arbiter 112, upon receipt of a buffer allotment request 106 may determine if there is sufficient storage space in the memory buffer 118 to store data necessary to execute the transaction command 108 contained in the transaction queue 102. If there is sufficient storage space in the memory buffer 118 to execute the transaction, the transaction command 108 may be allowed to proceed and be executed. If there is insufficient storage space in the memory buffer 118 to execute the transaction, the buffer arbiter 112 may block the transaction command 108 until there is sufficient storage space in the memory buffer 118 to process the transaction command 108. Upon receipt of a buffer release command 110, the buffer arbiter 112 may update the buffer arbiter 112 count to represent a release of the portion of the memory buffer 118 utilized by the transaction command 108.

The command processor 114 may monitor the one or more transaction queues 102 and may read and process input commands 104 submitted to the transaction queue 102 as determined by the defined order. The command processor 114 may copy data associated with the system and/or network transaction into the designated input and output buffer locations, initiate send and receipt of system and/or network data, notify system modules of completion of transactions, and/or perform other operations necessary to process input commands 104. In some embodiments, the command processor 114 may recognize buffer allotment requests 106 and buffer release commands 110. In such embodiments, the command processor 114 may utilize the buffer arbiter 112 to determine if there is sufficient storage space in the memory buffer 118 to process a queued transaction command 108. The command processor 114 may then, in some embodiments, preclude a transaction command 108 from processing until there is sufficient storage space in the memory buffer 118 to process the command. In some embodiments, the command processor 114 may access the memory hierarchy system 124 to store data required to complete input commands 104.

As further illustrated in FIG. 1, the transaction processing system 100 may further include a memory hierarchy system 124. The memory hierarchy system 124 may include at least one memory buffer 118 and a main memory 120. In some embodiments, the memory hierarchy system 124 may further include additional cache memory. The memory buffer 118 may be confined to a smaller and faster memory type, such as cache memory, to provide fast access to stored data. The memory buffer may also be contained in multiple levels of the memory hierarchy system 124 to provide more storage space for data associated with transaction commands 108.

In some embodiments, the main memory 120 may be communicatively connected to the cache memory containing the memory buffer 118 by a main memory bus 122. In some embodiments, the main memory bus 122 may be configured to allow the main memory 120 to transmit and receive data to and from the memory buffer 118. The main memory bus 122, in some embodiments, may be the same communication bus used to send input commands 104 to the transaction processing module 116. In some embodiments, the main memory bus 122 may also be the same communication mechanism used as the command memory interface bus 126, to send data to and from the command processor 114 and the memory hierarchy system 124.

With continued reference to FIG. 1, a transaction command 108 is illustrated that may require the temporary storage of data in the memory hierarchy system 124 including the memory buffer 118. As an example, a transaction command 108 may be a remote direct memory access (RDMA) read or write command. To improve efficiency in an RDMA read command, for example, the transaction processing system 100 may provide readily accessible space for data to be temporarily held in the memory buffer 118 as it is read from a requested memory location. Cache memory generally provides a readily accessible location to hold data associated with a transaction command 108 as the transaction command 108 is processed. The associated data will remain in the memory buffer 118 until the RDMA read command has been completed and the data has been sent to a requestor at the appropriate network location. If the memory buffer 118 becomes full, data associated with the transaction command 108 may be evicted to lower levels of memory in the memory hierarchy system 124, such as main memory 120. Eviction of associated data to the main memory 120 may drastically slow the transaction command 108 and may occupy limited bandwidth on the main memory bus 122. To prevent eviction of data associated with such a transaction command 108, in some embodiments, the transaction processing system 100 may utilize the buffer arbiter 112 by preceding the transaction command 108 with a buffer allotment request 106. Further, in some embodiments, the transaction processing system 100 may utilize the buffer arbiter 112 by following the transaction command 108 with a buffer release command 110. By utilizing the buffer arbiter 112 and/or command processor 114 to recognize a buffer allotment request and hold transaction commands 108 until there is sufficient storage space in the readily accessible memory buffer 118, eviction of data associated with the transaction command 108 from the memory buffer 118 may be avoided.

Similarly, to improve efficiency in an RDMA write command, the transaction processing system 100 may provide a readily accessible memory buffer 118 for the data associated with the RDMA write command to be temporarily held as it is written to a specified memory location. Cache memory again provides a readily accessible storage location. By preceding the transaction command 108 representing the RMDA write command with a buffer allotment request 106, the transaction processing system 100 may ensure data associated with the RDMA write command remains in a readily accessible memory buffer 118 until the RDMA write command is complete. In addition, following the transaction command 108 representing the RDMA write command with a buffer release command 110, may ensure that memory buffer 118 resources are quickly released and available for use by other transaction commands 108.

In some embodiments, the transaction command 108 may be a system operation or a standard network command in compliance with RDMA, Ethernet, InfiniBand, Internet Protocol (IP), hypertext transfer protocol (HTTP), or other network protocol. Still, in other embodiments, the transaction command 108 may be a transaction modified to comply with the transaction processing module 116 and an associated transaction queue's 102 defined interface. Such an interface may be defined, for example, through an application programming interface (API). According to any embodiment, the transaction command 108 may contain necessary information for the command processor 114 to execute the transaction used to generate the transaction command 108.

As described above and illustrated in FIG. 1, a buffer allotment request 106 may precede a transaction command 108 in the transaction queue 102, indicating the storage space required in the memory buffer 118 for the corresponding transaction command 108. In some embodiments, the buffer arbiter 112, in response to recognizing the buffer allotment request 106, may preclude the corresponding transaction command 108 from processing until the buffer arbiter 112 determines there is sufficient storage space in the memory buffer 118 to execute the transaction command 108. In other embodiments, a command processor 114 may be configured to recognize a buffer allotment request 106. In such embodiments, the command processor 114 may utilize the buffer arbiter 112 to determine if there is sufficient storage space in the memory buffer 118 to process the queued transaction command 108. The command processor 114 may then, in some embodiments, preclude the transaction command 108 from processing until there is sufficient storage space in the memory buffer 118 to process the command. In some embodiments, a transaction processing module 116 may utilize a quality of service (QoS) policy to override the transaction command 108 that is awaiting sufficient space in the memory buffer 118 before executing. For example, if a transaction command 108 requiring a comparatively large amount of storage space is continually blocked from processing while other transaction commands 108 from other transaction queues 102 requiring comparatively smaller amounts of storage space continue to process, these other transaction commands 108 may continually consume the available storage space in the memory buffer 118. A QoS policy may determine that the transmission delay for the large transaction command 108 has exceeded a threshold and a QoS mechanism may allow the larger transaction command 108 to proceed.

Also described above and further illustrated in FIG. 1, a buffer release command 110 may succeed a transaction command 108 in the transaction queue 102, indicating the storage space allocated for the associated transaction command 108 in the memory buffer 118 is no longer being utilized and may be made available for use by other transaction commands 108. In some embodiments, the buffer arbiter 112, in response to recognizing the buffer release command 110, may update the buffer arbiter 112 count representing the available space in the memory buffer 118. In some embodiments, by including a buffer release command 110 in the transaction queue 102 following the associated transaction command 108, storage space in the memory buffer 118 may be released immediately following completion of the transaction command 108 utilizing the storage space. Such an embodiment, avoids the need to provide a notification to a software application and rely on a software application to release the associated storage space in the memory buffer 118, thereby eliminating unnecessary delays to the transaction processing system 100.

FIG. 2 illustrates another embodiment of a transaction processing system 200 as an exemplary system for receiving system and/or network transactions at a central processor 202 and sending input commands 104 associated with the system and/or network transactions, including buffer allotment requests 106 and buffer release commands 110, to the transaction processing module 116. The central processor 202 of FIG. 2 may be embodied in an entirely hardware embodiment, an entirely computer program product embodiment, an entirely firmware embodiment (e.g., application-specific integrated circuit, field-programmable gate array, etc.), and/or an embodiment that comprises a combination of computer program products, hardware, and firmware. In addition, the central processor 202, transaction processing module 116, and memory hierarchy system 124 may be embodied on a single computing device or distributed across a plurality of computing devices collectively configured to function as the transaction processing system 200. It will be appreciated that the transaction processing system 200 is provided as an example of an embodiment and should not be construed to narrow the scope or spirit of the disclosure in any way.

The central processor 202 of FIG. 2 may be communicatively connected with a source via a network interface 208 so as to receive system and/or network transactions from the source. Network transactions received on the network interface 208 may comprise for example system transactions/operations, network put/post commands, network read/write commands, network atomic commands, direct memory access (DMA) commands, remote direct memory access (RDMA) read/write commands, compression, encryption, and/or similar messages. In some embodiments, a central processor 202 may be configured to generate and send input commands 104 associated with a network transaction to the transaction queue 102. Input commands 104 may include transaction commands 108, buffer allotment requests 106, buffer release commands 110, and/or other commands necessary to execute system and/or network transactions on the transaction processing module 116. In some embodiments, the input commands 104 may be sent to the transaction queue 102 using a TPM interface bus 204. The TPM interface bus 204, in some embodiments, may be the same communication bus as the main memory bus 122, the command memory interface bus 126, a central processor memory interface bus 206, and/or other communication busses communicatively connecting a network transaction processing system's 200 components. In some embodiments, these communication busses may be implemented using a high-speed serial computer expansion bus standard such as Peripheral Component Interconnect (PCI), PCI Express (PCIe or PCI-e), PCI eXtended (PCI-X), Accelerated Graphics Port (AGP), or other similar high-speed communication connection.

In some embodiments, the central processor 202 may be configured to generate transaction commands 108 based at least in part on network transactions received on the network interface 208. In some embodiments, the transaction processing module 116 and transaction queue 102 may be configured to receive system and/or network transactions without modification. In such an embodiment, the transaction command 108 may be equivalent to the system and/or network transaction received on the network interface 208. In such embodiments, the central processor 202 may relay system and/or network transactions received on the network interface 208 to the transaction processing module 116 without modification. In other embodiments, a form may be defined by the transaction processing system 100 to be recognizable by the transaction processing module 116 and/or by the transaction queue 102. The form of the input commands 104 may be defined, for example, through an application programming interface (API). In such an embodiment, the central processor 202 may encapsulate a network transaction in a defined form such that a transaction command 108 may define substantially all of the elements necessary to execute the associated network transaction.

In some embodiments, the central processor 202 may generate the buffer allotment request 106 to be sent to the transaction queue 102 in coordination with the transaction command 108. In other embodiments, the buffer allotment request 106 may be generated by the transaction processing module 116 and automatically added to the transaction queue 102 in coordination with the transaction command 108. The buffer allotment request 106 may be capable of indicating an amount of storage space required in the memory buffer 118 by an associated transaction command 108.

In addition, in some embodiments, the central processor 202 may be configured to generate the buffer release command 110 and send the buffer release command 110 to the transaction queue 102 in coordination with a transaction command 108. In other embodiments, the buffer release command 110 may be generated by the transaction processing module 116 and automatically added to the transaction queue 102 in coordination with the transaction command 108. The buffer release command 110 may be capable of indicating an amount of storage utilized by an associated transaction command 108 in the memory buffer 118. Upon receipt of the buffer release command 110, the transaction processing module 116 may release storage space in the memory buffer 118 utilized by the associated transaction command 108 at least in part by updating the buffer arbiter 112 count representing the amount of storage available in the memory buffer 118.

In some embodiments, the transaction processing module 116 may provide a notification to the central processor 202 indicating that the transaction command 108 is complete. In response to receipt of the notification of a complete command, the central processor 202 may generate and send the buffer release command 110 to the transaction queue 102.

With continued reference to FIG. 2, in some embodiments, the central processor 202 may interface with the memory hierarchy system 124 through a central processor memory interface bus 206. The central processor memory interface bus 206 may utilize the same communication bus used by the transaction processing module 116 to communicatively connect with the memory hierarchy system 124. In some embodiments, the central processor memory interface bus 206 may allow the central processor 202 to request space in the memory hierarchy system 124, store data in the memory hierarchy system 124, and/or otherwise access storage locations in the memory hierarchy system 124.

In some embodiments, the central processor memory interface bus 206, the TPM interface bus 204, the main memory bus 122, and the command memory interface bus 126 may all share a common communication interface. In addition, in some embodiments any combination of these communication channels may be shared on a common communication bus. In some embodiments, the communication busses may be any means, such as a device or circuitry embodied in either hardware, or a combination of hardware and software that is configured to receive and/or transmit data from/to a network and/or any other device or circuitry in communication with the transaction processing system 100. Accordingly, the communication busses may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods. The communication busses may be configured to receive and/or transmit any data that may be stored in the memory hierarchy system 124 or other memory using any protocol that may be used for communications between devices, such as Peripheral Component Interconnect Express ("PCIe"), PCI Express (PCIe or PCI-e), PCI eXtended (PCI-X), Accelerated Graphics Port (AGP), Remote Direct Memory Access ("RDMA") protocol, or other similar high-speed communication connection.

With reference to FIG. 3, a block diagram illustrating operations associated with a buffer allotment request 106 is provided in accordance with some embodiments. In some embodiments, the buffer allotment request 106 may comprise a transaction identifier 300 and a buffer usage indicator 302. The transaction identifier 300 may be any identifier, flag, heading, title, name, character sequence, or other similar structure intended to identify a corresponding transaction command 108. In some embodiments, the transaction identifier 300 may be omitted and the associated transaction command 108 may instead be implied by the buffer allotment request's 106 proximity to the transaction command 108. For example, the command processor 114 and/or the buffer arbiter 112 may be configured to recognize a command immediately succeeding the buffer allotment request 106 as an associated transaction command 108. The transaction command 108 associated with the buffer allotment request 106 may be blocked from executing until the command processor 114 and/or the buffer arbiter 112 determine that the memory buffer 118 has sufficient available storage space to process the transaction command 108.

As further illustrated in FIG. 3, the buffer allotment request 106 may also include a buffer usage indicator 302. The buffer usage indicator 302 may be any indicator intended to represent the amount of storage required in the memory buffer 118 to process an associated transaction command 108 identified by the transaction identifier 300 or by the buffer allotment request's 106 proximity to the transaction command 108 in the transaction queue 102. In some embodiments, a buffer usage indicator 302 may be determined by the central processor 202 based on the type or size of the transaction command 108. In other embodiments, the transaction processing module 116 may determine the buffer usage indicator 302 upon receipt of the transaction command 108, another system operation, and/or other standard network transaction.

With reference to FIG. 4, a block diagram of a buffer release command 110 is provided in accordance with some embodiments. In some embodiments, the buffer release command 110 may include a transaction identifier 400 and a buffer usage indicator 402. The transaction identifier 400 may be any identifier, flag, heading, title, name, character sequence, or other similar structure, intended to identify a corresponding transaction command 108. In some embodiments, the transaction identifier 300 may be implied by the buffer release command's 110 proximity to the transaction command 108. For example, the command processor 114 and/or the buffer arbiter 112 may be configured to recognize a command immediately preceding the buffer release command 110 as an associated transaction command 108. In such embodiments, the transaction identifier 300 may be unnecessary to identify the associated transaction command 108 and, therefore, may be omitted. For example, when the buffer release command 110 is placed in the same transaction queue 102 as an associated transaction command 108, and the buffer release command 110 follows the transaction command 108 in the transaction queue 102, the command processor 114 will not process the buffer release command 110 until after the transaction command 108 has completed processing. As such, the command processor 114 may not need to associate the buffer release command 110 with the corresponding transaction command 108. The command processor 114 and/or the buffer arbiter 112 may recognize the buffer release command 110 and update the buffer arbiter 112 count to represent the release of storage space in the memory buffer 118 upon completion of the associated transaction command 108. The release of the memory buffer's 118 storage space through the update of the buffer arbiter 112 count may indicate availability of storage space of the memory buffer 118 to be utilized by another transaction command 108 awaiting processing.

The buffer release command 110 may further include a buffer usage indicator 402, as shown in FIG. 4. The buffer usage indicator 402 may be any indicator intended to represent the amount of storage utilized in the memory buffer 118 by an associated transaction command 108 identified by the transaction identifier 400 or by the buffer allotment request's 106 proximity to the transaction command 108 in the transaction queue 102. In some embodiments, a buffer usage indicator 402 may be substantially identical to the buffer usage indicator 302 contained in the buffer allotment request 106 associated with the same transaction command 108. In some embodiments, a buffer usage indicator 402 may be determined by the central processor 202 based on the type or size of the transaction command 108. In other embodiments, the transaction processing module 116 may determine the buffer usage indicator 402 upon receipt of the transaction command 108, a standard network transaction, or another system operation.

Referring now to FIG. 5, a flowchart is provided illustrating an example process 500 for precluding system and/or network transactions from processing until there is sufficient storage space in the memory buffer 118 necessary to execute the system and/or network transaction.

At block 502, the transaction queue 102 receives a buffer allotment request 106. The buffer allotment request 106 may be configured to indicate an amount of storage space required in the memory buffer 118 by the associated transaction command 108 to ensure the storage space of the memory buffer 118 will not become filled during execution of the transaction command 108 (e.g., will not evict data associated with the transaction command 108 to lower levels of memory in the memory hierarchy system 124). By avoiding evicting data associated with the processing transaction command 108, the transaction processing system 100 may avoid slowdowns associated with reading and writing transaction data to and from the lower levels of memory in the memory hierarchy system 124. Further, precluding the transaction command 108 from executing until there is sufficient space in the memory buffer 118 to hold the associated data may prevent unnecessary traffic from occupying bandwidth on the main memory bus 122.

At block 504, the transaction queue 102 receives a transaction command 108 requiring the storage of data in the memory buffer 118 to enable the transaction processing module 116 quick access to the associated data while the transaction command 108 is executed.

At block 506, the transaction processing module 116 precludes the transaction command 108 from processing until the command processor 114 and/or the buffer arbiter 112 determine that the memory buffer 118 has sufficient storage space to hold the data associated with the transaction command 108. In some embodiments, the determination of adequate storage space may be based at least in part on a buffer arbiter 112 count and an associated buffer allotment request 106.

At block 508, the transaction processing module 116 processes the transaction command 108 after the command processor 114 and/or the buffer arbiter 112 determines there is sufficient storage space in the memory buffer 118 to store all the data associated with the transaction command 108 while processing.

At block 510, the transaction queue 102 receives a buffer release command 110. The buffer release command 110 may be configured to identify the amount of storage space utilized in the memory buffer 118 by the associated transaction command 108. Upon receiving the buffer release command 110, the transaction processing module 116 may release the storage space in the memory buffer 118 utilized by the associated transaction command 108 at least in part by updating a buffer arbiter 112 count representing the amount of storage available in the memory buffer 118.

Referring now to FIG. 6, a flowchart is provided illustrating an example process 600 for precluding system and/or network operations from processing until there is sufficient storage space in a memory buffer 118 to store the data associated with the operation when system and/or network transactions are received by the central processor 202.

At block 602, the central processor 202 receives a system and/or network transaction requiring storage of data in a memory buffer 118.

At block 604, the central processor 202 generates a buffer allotment request 106 indicating the amount of storage space required in the memory buffer 118 to process the transaction. The central processor 202 may determine the amount of storage space in the memory buffer 118 required by the transaction command 108 based on the type, size, or some other indicator associated with the transaction command 108.

At block 606, the central processor 202 sends a buffer allotment request 106 to the transaction queue 102. As further illustrated in block 606, the central processor 202 may subsequently send the transaction command 108 corresponding to the received transaction, to a transaction queue 102.

At block 608 the central processor 202 generates a buffer release command 110 indicating to the transaction processing module 116 to release storage space on the memory buffer 118 utilized by the associated transaction command 108.

At block 610, the central processor 202 sends the buffer release command 110 corresponding to the transaction command 108 to the transaction processing module 116.

At block 612, the command processor 114 and/or the buffer arbiter 112 preclude the transaction command 108 from processing until the buffer arbiter 112 and/or command processor 114 determine the memory buffer 118 has sufficient storage space to hold data associated with the transaction command 108. The determination of adequate storage space, in some embodiments, may be based at least in part on the buffer arbiter 112 count and the associated buffer allotment request 106.

At block 614, the transaction processing module 116 executes the transaction command 108 after determining the memory buffer 118 has sufficient storage space to process the transaction command 108.

At block 616, the buffer arbiter 112 or command processor 114 identifies the buffer release command 110 from the transaction queue 102 indicating completion of the transaction command 108 utilizing storage space on the memory buffer 118. The command processor 114 and/or the buffer arbiter 112 may recognize the buffer release command 110 and update the buffer arbiter 112 count to represent the release of storage space in the memory buffer 118. The release of the memory buffer's 118 storage space through the update of the buffer arbiter 112 count may indicate availability of memory buffer 118 storage space to be utilized by another transaction command 108 awaiting processing.

Referring now to FIG. 7, a flowchart is provided illustrating an example process 700 for utilizing a buffer arbiter 112 to determine if there is sufficient space in a memory buffer 118 to store the data associated with a transaction command 108.

At block 702, the buffer arbiter 112 count is initialized to a value representing the total storage space available for system and/or network transactions in the memory buffer 118. The initial buffer arbiter 112 count may represent the entire cache memory space, a portion of the cache memory space, or any portion of the memory hierarchy system 124 allotted for temporary storage of transaction command 108 data. A buffer arbiter 112 may be initialized by an external software host such as a central processor 202 or may be initialized by the transaction processing system 100 at startup or upon reset.

At block 704, the buffer arbiter 112 count is updated in response to processing a buffer allotment request 106 based on a buffer usage indicator 302. Once updated, the buffer arbiter 112 count will represent an amount of storage space available while the associated transaction command 108 is processing.

At block 706, the buffer arbiter 112 count is updated in response to processing a buffer release command 110 and based on a buffer usage indicator 402. Once updated, the buffer arbiter 112 count will represent the amount of storage space available after completion of the associated transaction command 108. The release of the memory buffer's 118 storage space through the update of the buffer arbiter 112 count may indicate availability of memory buffer 118 storage space to be utilized by another transaction command 108 awaiting processing.

Many modifications and other embodiments of the inventions set forth herein will come to mind to one skilled in the art to which these inventions pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
receiving, by a transaction queue, a transaction and a buffer allotment request,
wherein the transaction requires storage space in a memory buffer communicably coupled with the transaction queue, and
wherein the buffer allotment request comprises a first buffer usage indicator corresponding to the storage space required in the memory buffer to execute the transaction;
precluding, by a buffer arbiter, in response to processing the buffer allotment request, the transaction from processing until determining the memory buffer has sufficient storage space for executing the transaction;
executing the transaction in response to determining the memory buffer has the sufficient storage space defined by the first buffer usage indicator;
receiving, by the transaction queue, a buffer release command comprising a second buffer usage indicator corresponding to storage space in the memory buffer that will be released after execution of the transaction; and
processing the buffer release command following completion of processing of the transaction such that the storage space in the memory buffer used for executing the transaction is released.

2. The method of claim 1, further comprising:
receiving, by a central processor, the transaction requiring the storage space in the memory buffer; and
sending, by the central processor, the buffer allotment request, the transaction, and the buffer release command to the transaction queue.

3. The method of claim 1, further comprising:
initializing a buffer arbiter count maintained by the buffer arbiter to a value representing an available storage in the memory buffer.

4. The method of claim 3, further comprising:
updating the buffer arbiter count, in response to processing the buffer allotment request, based on the first buffer usage indicator; and
updating the buffer arbiter count, in response to processing the buffer release command, based on the second buffer usage indicator.

5. The method of claim 1, further comprising:
processing the transaction by a command processor; and
confining the memory buffer to a cache memory associated with the command processor.

6. The method according to claim 1, wherein the buffer release command comprising the second buffer usage indicator is received alongside the transaction and the buffer allotment request.

7. The method according to claim 1, wherein the buffer release command is stored in the transaction queue following the received transaction.

8. The method according to claim 1, wherein the buffer release command is associated with a transaction identifier and a buffer usage indicator.

9. The method according to claim 8, wherein the transaction identifier is determined based on a proximately between the buffer release command and the transaction in the transaction queue.

10. A system comprising:
a memory buffer configured to store data; and a transaction queue communicably coupled with the memory buffer, the transaction queue configured to receive a transaction, a buffer allotment request, and a buffer release command wherein:

the transaction requires storage space in the memory buffer;

the buffer allotment request comprises a first buffer usage indicator corresponding to the storage space required in the memory buffer for executing the transaction; and a buffer arbiter configured to receive the buffer allotment request and to preclude the transaction from executing in response to the buffer allotment request until the buffer arbiter determines the memory buffer has the sufficient storage space to execute the transaction defined by the first buffer usage indicator; and the buffer release command comprises a second buffer usage indicator corresponding to storage space in the memory buffer that will be released after execution of the transaction, wherein the buffer release command is scheduled to be processed following processing of the transaction such that the storage space in the memory buffer used for executing the transaction is released.

11. The system of claim 10, further comprising a central processor configured to receive the transaction requiring storage of data in the memory buffer and transmit the buffer allotment request, the transaction, and the buffer release command to the transaction queue.

12. The system of claim 10, wherein the buffer arbiter further comprises a buffer arbiter count representing an available storage in the memory buffer.

13. The system of claim 12, wherein the buffer arbiter count is updated in response to processing the buffer allotment request, based on the first buffer usage indicator; and the buffer arbiter count is updated in response to processing the buffer release command, based on the second buffer usage indicator.

14. The system of claim 10, wherein the transaction is processed by a command processor and the memory buffer is confined to a cache memory associated with the command processor.

15. The system of claim 14, wherein the buffer arbiter is implemented as part of the command processor.

16. The system according to claim 10, wherein the buffer release command comprising the second buffer usage indicator is received alongside the transaction and the buffer allotment request.

17. The system according to claim 10, wherein the buffer release command is stored in the transaction queue following the received transaction.

18. The system according to claim 10, wherein the buffer release command is associated with a transaction identifier and a buffer usage indicator.

19. The system according to claim 18, wherein the transaction identifier is determined based on a proximately between the buffer release command and the transaction in the transaction queue.

20. A computer program product comprising at least one non-transitory computer-readable storage medium having computer-executable program code instructions comprising program code instructions to:

receive, by a transaction queue, a transaction and a buffer allotment request, wherein the transaction requires storage space in a memory buffer communicably coupled with the transaction queue, and wherein the buffer allotment request comprises a first buffer usage indicator corresponding to the storage space required in the memory buffer to execute the transaction;

preclude, by a buffer arbiter, in response to processing the buffer allotment request, the transaction from processing until determining the memory buffer has the sufficient storage space for executing the transaction defined by the first buffer usage indicator;

execute the transaction in response to determining the memory buffer has sufficient storage space;

receive, by the transaction queue, a buffer release command comprising a second buffer usage indicator corresponding to storage space in the memory buffer that will be released after execution of the transaction; and process the buffer release command following completion of processing of the transaction such that the storage space in the memory buffer used for executing the transaction is released.

* * * * *